United States Patent
Chiba et al.

(10) Patent No.: US 6,360,866 B1
(45) Date of Patent: Mar. 26, 2002

(54) CONVEYING APPARATUS FOR ELECTRIC PARTS

(75) Inventors: Minoru Chiba; Akira Saito; Fukashi Ogasawara; Isao Kobayashi, all of Ota-ku (JP)

(73) Assignee: Tokyo Weld Co., Ltd., Tokyo-to (JP)

( * ) Notice: Subject to any disclaimer, the term of this patent is extended or adjusted under 35 U.S.C. 154(b) by 0 days.

(21) Appl. No.: 09/438,462

(22) Filed: Nov. 12, 1999

(30) Foreign Application Priority Data

Nov. 13, 1998 (JP) ............................................. 10-324097

(51) Int. Cl.[7] .............................................. B65G 17/12
(52) U.S. Cl. ............................... 198/303.14; 198/803.15
(58) Field of Search ........................ 198/803.14, 803.15

(56) References Cited

U.S. PATENT DOCUMENTS

| | | | | |
|---|---|---|---|---|
| 3,129,814 A | * | 4/1964 | Cheh et al. ............. | 198/803.15 |
| 3,231,065 A | * | 1/1966 | Kaminski et al. ....... | 198/803.15 |
| 4,418,815 A | * | 12/1983 | Anderson et al. ........... | 198/476 |
| 4,502,589 A | * | 3/1985 | Fichtner ..................... | 198/484 |
| 4,533,038 A | * | 8/1985 | Richard ...................... | 198/646 |
| 4,540,088 A | * | 9/1985 | Bergh ..................... | 198/803.15 |
| 4,588,066 A | * | 5/1986 | Kaminski ................... | 198/345 |
| 4,693,370 A | * | 9/1987 | Aceti .......................... | 206/488 |
| 4,747,479 A | * | 5/1988 | Herrman ..................... | 198/345 |
| 4,936,442 A | * | 6/1990 | Von Till ................. | 198/803.01 |
| 4,946,028 A | * | 8/1990 | Eichmann et al. ....... | 198/688.1 |
| 5,113,701 A | * | 5/1992 | Martin ......................... | 118/58 |
| 5,113,785 A | * | 5/1992 | Martin ......................... | 118/58 |
| 5,125,503 A | * | 6/1992 | Ueberreiter et al. ... | 198/803.01 |
| 5,191,693 A | * | 3/1993 | Umetsu ....................... | 29/429 |
| 5,197,259 A | * | 3/1993 | Menayan ..................... | 53/399 |
| 5,287,957 A | * | 2/1994 | Iuchi et al. ............ | 198/803.14 |
| 5,484,052 A | * | 1/1996 | Pawloski et al. ...... | 198/803.01 |
| 5,630,499 A | * | 5/1997 | Louden et al. ......... | 198/803.01 |

* cited by examiner

*Primary Examiner*—Joseph E. Valenza
*Assistant Examiner*—Rashmi Sharma
(74) *Attorney, Agent, or Firm*—Jacobson Holman, PLLC

(57) ABSTRACT

A conveying apparatus for electric parts has a tape and a driving mechanism. The tape has holding holes for holding board-shaped electric parts therein at regular intervals and feeding holes for feeding the tape at regular intervals. The driving mechanism can feed the tape by engaging with the feeding holes of the tape. Each of the holding holes has a pair of abutting edges for abutting on both opposite surfaces of the board-shaped electric parts and at least one cutout portion formed from the abutting edges. Due to the above constitution, the board-shaped electric parts are held by the pair of abutting edges. Thus, the electric parts can be conveyed with their attitude kept fixed regardless of adverse influences such as vibrations from the moving tape, and can be easily removed from the holding holes by using the cutout portions.

6 Claims, 3 Drawing Sheets

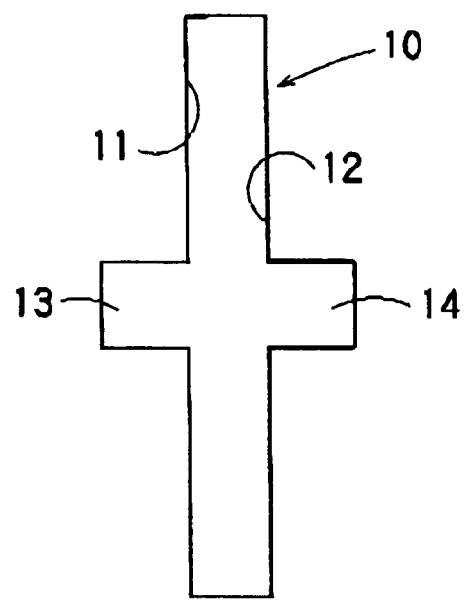
F I G. 3
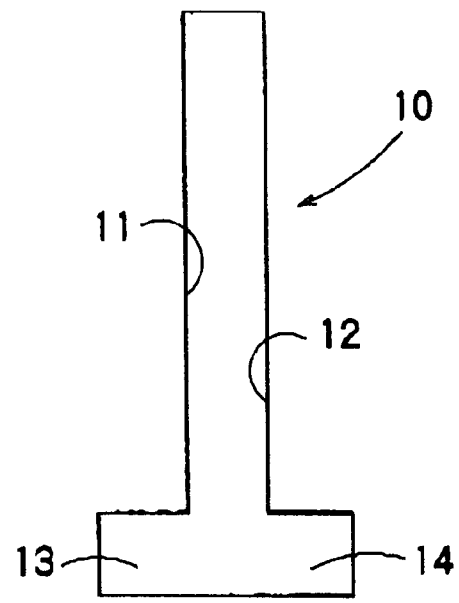
F I G. 4

CONVEYING APPARATUS FOR ELECTRIC PARTS

BACKGROUND OF THE INVENTION

1. Field of the Invention

This invention relates to a conveying apparatus for electric parts, in particular, to a conveying apparatus that can convey board-shaped electric parts with their attitudes kept fixed.

2. Description of the Related Art

Produced electric parts are usually sent to a testing unit or a marking unit in turn to undergo a testing operation or a marking operation.

In the prior art, electric parts are conveyed by a conveying tape that is intermittently moved.

In order to improve the efficiency of the testing operation or the marking operation for the produced electric parts, it is important that the electric parts can be easily removed from the conveying tape to be passed to the testing unit or the marking unit with their attitude kept fixed or unchanged.

However, in the prior art, the conveying tape sometimes does not allow the electric parts to be therefrom easily or smoothly.

SUMMARY OF THE INVENTION

The object of this invention is to solve the above problem, that is, to provide a conveying apparatus for electric parts, which can convey board-shaped electric parts with their attitude kept fixed and from which the board-shaped electric parts can be removed easily and simply.

In order to achieve the object, a conveying apparatus for electric parts according to the invention comprises: a tape having holding holes for holding board-shaped electric parts at regular intervals along a length thereof; and a driving mechanism for feeding the tape in the direction of the length thereof; and is characterized that each of the holding holes has a pair of opposite abutting edges for abutting on both opposite surfaces of the board-shaped electric parts, and at least one cutout portion formed in one of the abutting edges.

According to this invention, the board-shaped electric parts can be held by the pair of abutting edges. Thus, the electric parts can be conveyed with their attitude kept fixed regardless of adverse influences such as vibrations from the moving tape, and can be easily removed from the holding holes by using the cutout portions.

For example, the tape is made of paper.

Preferably, the pair of abutting edges are parallel with each other.

Preferably, the cutout portion is formed in a central portion of each of the abutting edges so that each of the holding holes is cross-shaped.

Alternatively, the cutout portion may be formed in an end portion of each of the abutting edges so that each of the holding holes is T-shaped.

Preferably, the tape has feeding holes at regular intervals along the length thereof and the driving mechanism has engaging means for engaging the feeding holes for feeding operation.

BRIEF DESCRIPTION OF THE DRAWINGS

FIG. 3 is an enlarged plan view of a holding hole shown in FIG. 1; and

FIG. 4 is an enlarged plan view of another example of the holding hole.

DETAILED DESCRIPTION OF THE INVENTION

An embodiment of the invention will now be described in more detail with reference to drawings.

Figure 1:
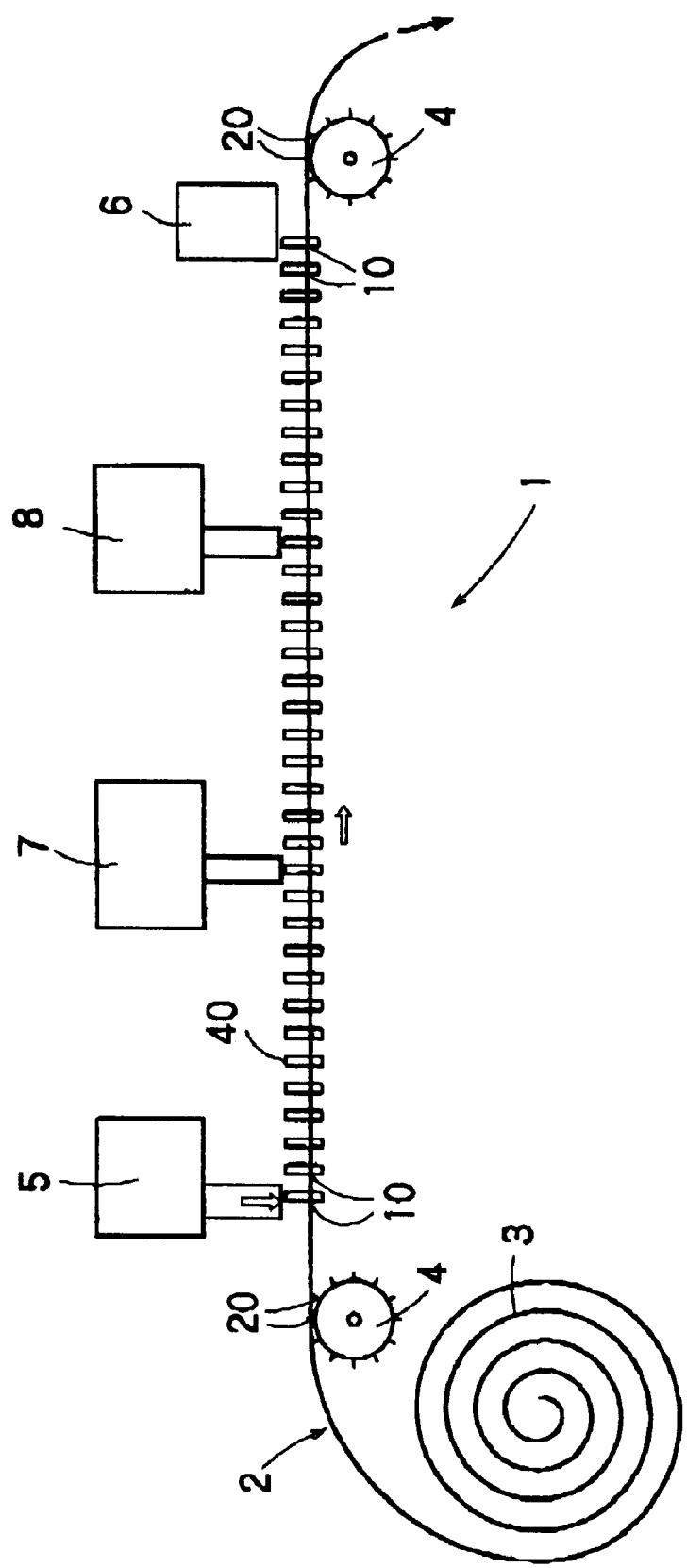
FIG. 1 is a schematic view of a first embodiment of the conveying apparatus for electric parts according to the invention.

FIG. 1 shows schematically the first embodiment of the conveying apparatus for electric parts according to the invention. As shown in FIG. 1, the conveying apparatus 1 includes a tape 2 which has holding holes 10 for holding board-shaped electric parts 40 therein, at regular intervals in the longitudinal direction of the tape and which has feeding holes 20 used for feeding the tape 2 at regular intervals. The tape 2 is made of paper, for example. The conveying apparatus 1 also includes a pair of driving mechanisms 4 each in the form of a pinned wheel having radial pins that engage with the feeding holes 20 of the tape 2 respectively, so that the tape 2 is stretched between, and fed by the driving mechanisms 4. For example, the tape 2 is prepared in a roll wound around a stock-reel 3, and is continuously and intermittently supplied or paid out from the stock-reel 3 to the driving mechanisms 4. The tape 2 is discarded after passing over the driving mechanisms 4.

As shown in FIG. 1, there is a supply unit 5 for the board-shaped electrical parts 40 and a take-out unit 6 for the parts 40 above a conveying path formed by the tape 2. In addition, there is a testing unit 7 for electrically testing the parts 40 between the supply unit 5 and the take-out unit 6 above the conveying path.

The driving mechanisms 4 are adapted to move or feed the tape 2 intermittently. The interval between adjacent holding holes 10 is the same as the interval between adjacent feeding holes 20 (see FIG. 2).

The interval between any two of the supply unit 5, the take-out unit 6, the testing unit 7 and the marking unit 8 is a multiple of the interval of the holding holes 10. Thus, the holding holes 10 or the board-shaped electric parts 40 that are held in the holding holes 10 are caused to stop at respective operational positions of the supply unit 5, the take-out unit 6, the testing unit 7 and the marking unit 8 after every intermittent movement. Therefore, the supply unit 5, the take-out unit 6, the testing unit 7 and the marking unit 8 are adapted to operate during each static period of the intermittent movement of the paper tape 2.

Figure 2:
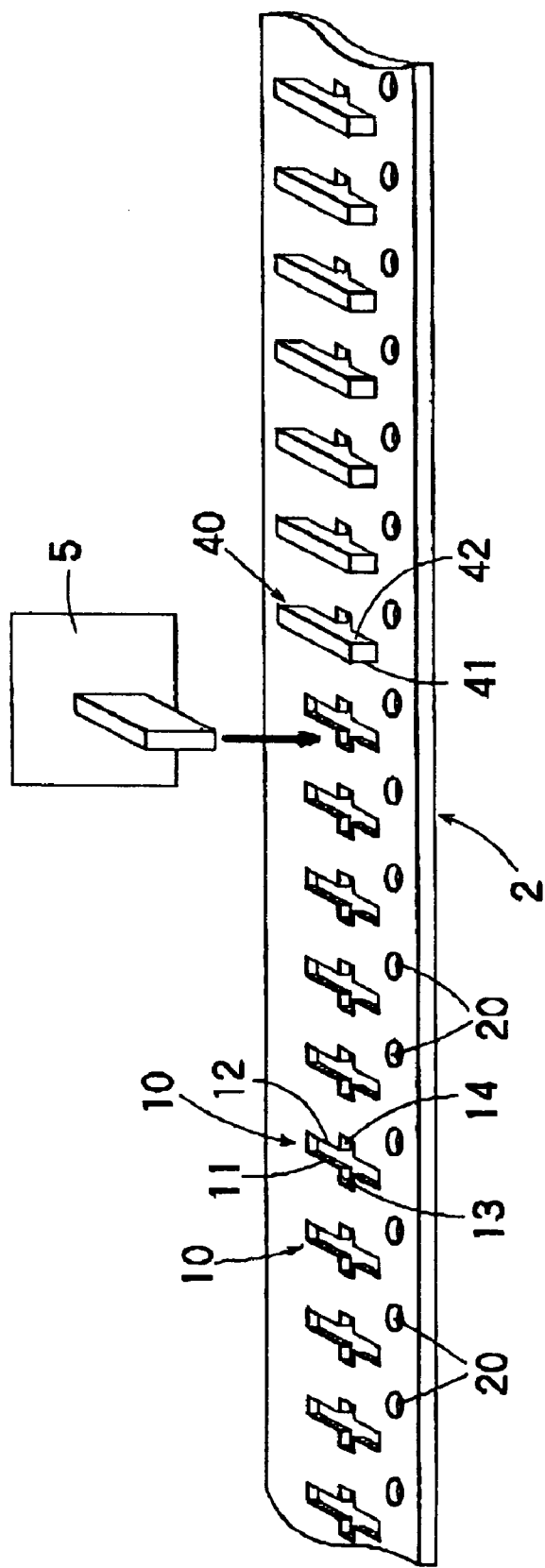
FIG. 2 is an enlarged perspective view of a paper tape shown in FIG. 1.

FIG. 2 is an enlarged perspective view of the paper tape 2 shown in FIG. 1, and FIG. 3 is an enlarged plan view of the holding hole 10 shown in FIGS. 1 and 2. As shown in FIGS. 2 and 3, each of the holding holes 10 has a pair of abutting edges 11, 12 for abutting on opposite surfaces 41, 42 of the board-shaped electric parts 40. Cutout portions 13 and 14 are formed by recessing opposite portions of the abutting edges 12 and 13. In this embodiment, the cutout portions 13 and 14 are formed in square-shape at substantially the central portions of the abutting edges 11 and 12. As a result, the holding holes 10 are cross-shaped. The recessed portions 13 and 14 may be in another shape. The feeding holes 20 are formed in small circular holes.

The conveying apparatus 1 of this embodiment operates as follows.

As shown in FIG. 1, the pair of driving mechanisms 4, which engage with the feeding holes 20 of the paper tape 2, operates to intermittently feed the holes 20 forward in turn. As a result, the tape 2 is fed forward intermittently.

When a holding hole 10 reaches just below the supply unit 5, the supply unit 5 operates to fit a board-shaped electric part 40 into the holding hole 10 during the static period of the intermittent movement. The opposite surfaces 41 and 42 are pressed between the pair of abutting edges 11 and 12 of the holding hole 10. The board-shaped electric part 40 is held in the holding hole 10 by frictional forces between the opposite surfaces 41, 42 and the abutting edges 11, 12.

The pressing force given by the supply unit 5 to insert the board-shaped electric part 40 into the holding hole 10 can be reduced because the cutout portions 13 and 14 reduce the contact area of the opposite surfaces 41, 42 with the abutting edges 11, 12.

Holding holes 10 are moved to just below the supply unit 5 in turn by the intermittent movement of the paper tape 2. As shown in FIGS. 1 and 2, the supply unit 5 operates to fit a board-shaped electric part 40 into each holding hole 10 during each static period of the intermittent movement.

The board-shaped electric parts 40 fitted into the holding holes 10 by the supply unit 5 are intermittently moved toward the testing unit 7 by the movement of the paper tape 2. When the electric part 40 reaches just below the testing unit 7, the electric part 40 is picked up from within the holding hole 10 by a transfer device (not shown) and undergoes a predetermined testing operation by the testing unit 7, during the static period of the intermittent movement. Pick-up elements of the transfer device makes use of the cutout portions 13 and 14 for picking up the electric part 40. Thereafter, the electric part 40 is fitted back into the holding hole 10 by the transfer device.

The electric parts 40 tested by the testing unit 7 are intermittently moved forward toward the marking unit 8 by the movement of the paper tape 2. When the electric part 40 reaches just below the marking unit 8, the electric part 40 is picked up from the holding hole 10 by a transfer device (not shown) and undergoes a marking operation by the marking unit 8, during the static period of the intermittent movement. The transfer device makes use of the cutout portions 13 and 14 for picking up the electric part 40. Thereafter the electric part 40 is fitted back into the holding hole 10 by the transfer device.

The board-shaped electric parts 40 processed by the marking unit 8 are intermittently moved toward the take-out unit 6 by the movement of the paper tape 2. When the electric part 40 reaches just below the take-out unit 6, the electric part 40 is picked up and taken out from the holding hole 10 by the take-out unit 6, during the static period of the intermittent movement. The take-out unit 6 makes use of the cutout portions 13, 14 for picking up the electric part 40.

According to the above embodiment, the board-shaped electric parts 40 can be held owing to the frictional forces between itself and the pair of abutting edges 11 and 12 of the holding hole 10. Thus, the board-shaped electric parts 40 can be conveyed with their attitude kept fixed regardless of influences such as vibrations from the moving paper tape 2.

In addition, the board-shaped electric parts 40 can be easily removed from the holding holes 10 by using the cutout portions 13, 14. Particularly, as the cutout portions 13, 14 are formed in substantially the central portions of the abutting edges 11 and 12, the board-shaped electric parts 40 can be removed more easily and stably.

The shape of the holding hole 10 is not limited by the above embodiment. For example, as shown in FIG. 4, the holding hole 10 may be T-shaped if the cutout portions 13, 14 are formed at the opposing end portions of the abutting edges 11, 12.

In addition, of course, the testing unit 7 or the marking unit a may be designed to conduct the predetermined operation while the board-shaped electric part 40 is kept fitted in the holding hole 10 in the paper tape 2.

What is claimed is:

1. A conveying apparatus for electric parts, comprising:

a tape having a plurality of holding holes for holding board-shaped electric parts at regular intervals along a length thereof;

a driving mechanism for feeding the tape in a direction of the length thereof;

each of the plurality of holding holes having a pair of opposite abutting edges for abutting on both opposite surfaces of the board-shaped electric parts; and at least one cutout portion being formed in one of the abutting edges;

a frictional force is generated between the opposite surfaces of a board-shaped electric part and the pair of opposite abutting edges in such a manner that the board-shaped electric part is held to maintain an attitude thereof while the pair of opposite abutting edges abut on both the opposite surfaces of the board-shaped electric part.

2. The conveying apparatus for electric parts according to claim 1, wherein:

the tape is made of paper.

3. The conveying apparatus for electric parts according to claim 1, wherein:

the pair of abutting edges are parallel with each other.

4. The conveying apparatus for electric parts according to claim 3, wherein:

said at least one cutout portion is formed in a central portion of each of the abutting edges so that each of the plurality of holding holes is cross-shaped.

5. The conveying apparatus for electric parts according to claim 3, wherein:

said cutout portion is formed in an end portion of each of the abutting edges so that each of the plurality of holding holes is T-shaped.

6. The conveying apparatus for electric parts according to claim 1, wherein:

the tape has a plurality of feeding holes at regular intervals along the length thereof and the driving mechanism has engaging means for engaging the plurality of feeding holes for a feeding operation.

* * * * *